3,679,604
ULTRA-STABLE 3-ANGSTROM MOLECULAR SIEVE

Hanju Lee and Dongsuk Chi, Columbia, Md., assignors to W. R. Grace & Co., New York, N.Y.
No Drawing. Filed Sept. 21, 1970, Ser. No. 74,217
Int. Cl. B01j 11/40; C01b 33/28
U.S. Cl. 252—455 Z
16 Claims

ABSTRACT OF THE DISCLOSURE

Ultra-stable 3 A. zeolite A molecular sieves can be produced from 4 A. zeolite A molecular sieves by the concurrent or sequential exchange of the 4 A. zeolite using potassium and rare earth ions. The resulting 3 A. zeolite A has a high steam and thermal stability, is very useful as an adsorbent, and can be reactivated using extreme environments for a subsequent reuse.

BACKGROUND OF THE INVENTION

This invention relates to a novel 3 A. zeolite A molecular sieve of high stability. Further, this invention relates to a method of producing an ultra-stable 3 A. zeolite A molecular sieve having a high thermal and steam stability.

The material designated as zeolite A is a well known material and has been described in U.S. Pat. 2,882,243. The aluminosilicate materials which fall under this designation have pore diameters in the range of 3 A. to 5 A. These materials as a class are generally used as adsorbents. As further background, the sodium form of zeolite A has a nominal pore size of about 4 A. and is in some instances designated zeolite 4A. This is the usual form in which zeolite A molecular sieves are synthesized. By exchanging the sodium ions of the 4 A. molecular sieve with calcium ions, the pore size is changed to about 5 A. This material is in some instances designated zeolite 5A and is a useful adsorbent. By exchanging the sodium ions of the 4 A. molecular sieve with potassium ions, the pore size is changed to about 3 A. This material is in some references designated as zeolite 3A. This invention is directed to an ultra-stable 3 A. zeolite A molecular sieve which has a nominal pore size of 3 A.

A serious problem with 3 A. zeolite A materials up to the present time is their low thermal and steam stability, especially in comparison to 5 A. zeolite A or other zeolite materials. For example, prescribed operation ranges for 3 A. zeolite A materials up to about 1000° F., precluding any burning off type of reactivation for reuse of the sieve. The 5 A. form of zeolite A and other molecular sieves which have lost their adsorption capacity, partially due to accumulated hydrocarbons or their derivatives such as coke during its application, can be reactivated by a burning off of the coke and other substances. Subjecting conventional 3 A. zeolite A sieves to such a burning off essentially destroys the sieve. This invention solves this problem of low thermal and steam stability in regard to 3 A. zeolite A molecular sieves. It has unexpectedly been discovered that a highly stable and readily regenerable 3 A. zeolite A molecular sieve can be produced by either of two related novel techniques. The end product 3 A. zeolite A is essentially the same for either process. This product ultra-stable 3 A. zeolite A consists essentially of a zeolite A molecular sieve containing up to about 60 mole percent of potassium ions and up to about 15 mole percent rare earth ions, which is produced either by concurrent or sequential exchange of a sodium 4 A. zeolite A sieve with potassium and rare earth ions.

It is an object of this invention to produce a new ultra-stable 3 A. zeolite A molecular sieve which can withstand burning off type of reactivation techniques.

It is additionally an object of this invention to set out a potassium and rare earth ion sequential exchange technique for producing an ultra-stable 3 A. zeolite A molecular sieve.

It is further an object of this invention to set out a novel 3 A. potassium ion-rare earth ion exchanged zeolite A molecular sieve having a substantially increased thermal and steam stability which can be regenerated using extreme environments.

It is also an object of this invention to set out a potassium and rare earth ion concurrent exchange technique for producing an ultra-stable 3 A. zeolite A molecular sieve.

BRIEF SUMMARY OF THE INVENTION

This invention comprises an ultra-stable potassium and rare earth exchanged zeolite A molecular sieve having a nominal 3 A. pore size. This novel molecular sieve is produced either by a sequential or concurrent ion exchange technique starting with a sodium form of zeolite A molecular sieve. In the sequential exchange technique, the sodium ions of the 4 A. zeolite A sieve are partially exchanged first using either a rare earth or potassium ion solution, optionally calcined, and then partially exchanged using the ion solution not used in the first partial exchange. In the concurrent ion exchange technique, the sodium 4 A. zeolite A sieve is contacted with a solution containing both potassium and rare earth ions, and in a preferred embodiment the potassium ion content of the exchange solution is substantially greater than the rare earth ion content.

DETAILED DESCRIPTION OF THE INVENTION

Broadly, this invention comprises an ultra-stable potassium and rare earth (element of atomic number of 57 to 71) ion containing zeolite A molecular sieve having a nominal pore size of 3 A. (angstroms). This 3 A. zeolite A sieve has a thermal and steam stability in the range of the calcium form of zeolite A, which form has stabilities considerably greater than conventional 3 A. zeolite A molecular sieve. That is, these ultra-stable zeolite A molecular sieves can be produced from the sodium form of zeolite A molecular sieves by a concurrent or sequential ion exchange technique. Using the concurrent ion exchange technique, the sodium zeolite A sieve is contacted with a potassium and rare earth ion containing solution wherein the mole ratio of ions to rare earth ions is about 10–30 to 1. In the sequential exchange technique, the sodium form of zeolite A sieve is contacted first with either a potassium or rare earth ion solution, optionally calcined, and then contacted with the ion containing solution not chosen for the first exchange.

By the use of either technique, it is essential that the potassium ions in the final sieve be in a concentration from about 30 to 60 cationic mole percent, and preferably about 40 to 50 cationic mole percent, and the rare earth ions be in a concentration of of from about 2 to 15 mole percent, and preferably 4 to 8 cationic mole percent. The potassium level (cationic mole percent) determines the pore size of the sieve. A level of from 30 to 60 cationic mole percent potassium ion is essential to provide an effective pore size of 3 A. In some usage, the designation of 3 A. zeolite A, or zeolite 3 A. has become synonymous with a solely potassium exchanged form of 4 A. zeolite. However, in this application, the technical designation of 3 A. pore size. Such a 3 A. zeolite A is selective for water vapor which has a molecular size within this range. The rare earth level of from 2 to 15 cationic mole percent is necessary to produce the high stability.

The material in this application designated 4 A. zeolite A is that set out in U.S. Pat. 2,882,243. This material has of formula of $Na_{12}(AlO_2)_{12}(SiO_2)_{12}$ which is a multiple of 6 of the empirical mineralogical oxide formula of $$Na_2O \cdot Al_2O_3 \cdot 2SiO_2$$

This material may also have from 4–5 waters of hydration. This zeolite A is crystalline and exhibits an X-ray powder diffraction pattern as set out in Table I.

TABLE I

Lattice planar distance, d, A.

12.2±0.2
8.6±0.2
7.05±0.15
4.07±0.08
3.68±0.07
3.38±0.06
3.26±0.05
2.96±0.05
2.73±0.05
2.60±0.05

In the first mode for practicing this invention, that is, the concurrent contacting of the sodium form of a zeolite A molecular sieve (sodium zeolite A) with a potassium and rare earth ion mixture, a compatible mixture of these ions is formed. In a preferred embodiment and for obvious economic reasons, an aqueous solvent is sued, although other solvents are suitable. The mixture is formulated so that there will be a potassium level of operably at least 30 cationic mole percent, and preferably about 45 cationic mole percent in the final 3 A. zeolite A molecular sieve product. The exchange technique consists essentially of contacting the sodium zeolite A sieve with the exchange solution. The exchange may be conducted at ambient temperatures up through reflux temperatures. The mixture concentration is critical only in that there must be at least a 30 cationic mole percent potassium content in a comparison to sodium and rare earth cationic content in the final 3 A. product sieve. In order to attain this level of at least about 30 percent potassium, the ratio of sieve to potassium ions to rare earth ions in the exchange solution should be in a molar ratio of about 4:10:1 to 8:30:1. This level of potassium ion in the exchange solution will insure a product within the above cationic mole percent range. The mixture may be stirred during exchange, but stirring is not essential. However, the time duration of contact will generally vary depending on the temperature of the exchange solution and the degree of stirring utilized. The time for adequate exchange is from 0.1 to 12 hours depending on the conditions. After contacting, the resulting 3 A. zeolite A sieve is separated from the contacting solution, washed, dried and may be activated.

In the second mode of practicing this invention, that is, by a sequential ion exchange, the sodium zeolite A sieve is contacted with either a rare earth ion or potassium solution, washed, optionally calcined at 500 to 1200° F., and this material then contacted with an ion solution not used in the first exchange. The resulting 3 A. zeolite A material is washed, dried and activated. The ion solutions utilized are preferably aqueous solutions, although select organic solvents, or organic-aqueous mixtures may be used. The contacting here may also be at ambient temperatures through reflux. Further, the mixture may also be stirred. Higher temperatures and mixing will have the effect of decreasing the required contact time. Suitable contact times are from 0.1 to 12 hours. There is no criticality or distinct advantage by first rare earth ion exchanging and then potassium ion exchanging, or by first potassium ion exchanging and then rare earth ion exchanging. The product 3 A. zeolite A is the same by either order. Further, the calcination step is optional, and does not yield sufficient advantages to warrant its use in all instances. The concentrations of the contacting solutions may vary since other factors will also affect the degree of exchange. These are temperature, mixing and contact time. However, preferred ratios, irrespective of the order of exchange, are sodium zeolite A 15 to 20 moles, potassium chloride 30 to 50 moles and rare earth chlorides 1.5 to 4 moles. It is theorized that the calcination step may serve to unlock the remaining sodium ions in the zeolite, making these more readily exchangeable. Suitable time durations of calcination operably ranges from 0.2 to 4 hours.

The rare earth ion-potassium ion, rare earth ion and potassium ion contacting solutions are conventional exchanging solutions. That is, these are formed by dissolving the appropriate metal salt such as chloride, sulfate, nitrate or other suitable inorganic salt in water. Organic metal salts such as the formates, acetates and so on may also be used. The useful concentrations of these solutions is not critical. Concentrations of from about 2 to 20 percent are preferred, with concentrations outside of this range still operable. However, the ratio of 4 A. zeolite sieve to available rare earth ion to available potassium ion is a critical feature. In general, rare earth ions exchange sodium ions at a faster rate and to a higher degree than potassium. For this reason, in the concurrent contacting the available potassium ions must always in an excess over the available rare earth ions. This is necessary to insure that there will be at least about a 30 cationic mole percent, and preferably at least 45 cationic mole percent, potassium ion concentration in the final 3 A. zeolite sieve. In the sequential contacting, the degree of exchange can be limited by adjusting the exchange parameters in each exchange step.

The following examples are set out to further amplify the present invention.

EXAMPLE I

This example sets out a convenient method for producing sodium zeolite A. A first solution is prepared from 400 ml. distilled water, 160 g. sodium hydroxide (NaOH) of reagent grade and 156 g. Al(OH)$_3$ of reagent grade. After heating and stirring in order to dissolve the solid material, the solution is brought up to 1500 ml. with distilled water. A second solution is formed by mixing 80 g. sodium hydroxide of reagent grade, 150 g. silicic acid, and 2000 ml. of water. These solutions are then combined with one another and mixed for one minute. The total composition of the reaction mixture obtained, expressed in the molar ratio of the oxides, is $$Na_2O/SiO_2 = 1.44$$
$$SiO_2/Al_2O_3 = 2.2$$
$$H_2O/Na_2O = 55$$

The mixture is then heated for 16 hours at a temperature of 90° C., and filtered in order to recover the 4 A. zeolite A crystals from the mother liquor. After washing and drying, samples of the product are taken for the X-ray and adsorption analyses as well as the chemical analysis. From the X-ray spectrometer diagram, it is found that the product consists practically 100 percent of sodium zeolite A. The chemical analysis is as follows:

$$0.99Na_2O \cdot Al_2O_3 \cdot 2.0SiO_2 \cdot 3.1H_2O$$

EXAMPLE II 7750 g. of sodium 4 A. molecular sieve (T.V. 26.7 percent) is treated with 24 liters of a solution containing 660 g. of rare earth chlorides (2.4 percent) and 2980 g. of potassium chloride (10.8 percent) at 200° F. for 1 hour. This sieve is then washed with water until there is no chloride in the wash and dried at 200° F. After drying it is activated by heating to a temperature of 700° F. for 2 hours. This product has a chemical analysis of 12.4 percent Na$_2$O, 11.0 percent K$_2$O and 5.2 percent Re$_2$O$_3$. This yields mole fractions of .601 Na$_2$O, .351 K$_2$O and .048 Re$_2$O$_3$.

EXAMPLE III 7750 g. of sodium 4 A. zeolite A molecular sieve (T.V. 26.7 percent) is treated with 25 liters of a solution containing 1386 g. of rare earth chlorides (4.5 percent) and 2980 g. of potassium chloride (10.2 percent) at 200° F. for 1 hour. This sieve is then washed with water until chloride free and dried at 200° F. After drying, it is activated by heating to a temperature of 700° F. for 2 hours. This product has a chemical analysis of 12.1 percent Na₂O, 10 percent K₂O and 6.2 percent Re₂O₃. This yields mole cationic fractions of 0.607 Na₂O, 0.334 K₂O and 0.059 Re₂O₃.

EXAMPLE IV 3875 g. of 4 A. zeolite A molecular sieve (T.V. 33.6 percent) are treated with 12.0 liters of a 2.7 percent rare earth chloride solution at 200° F. for 1 hour. The mixture is stirred during contacting. This partially rare earth exchanged zeolite A is washed twice with water, dried, and calcined at 1000° F. for 2 hours. This calcined material is cooled and treated with 13.0 liters of a 10.3 percent potassium chloride solution at 200° F. for 1 hour. This mixture is then filtered, washed three times, and dried at 200° F. This dried 3 A. zeolite A is then activated by heating to 700° F. for 2 hours. This had an analysis of 10.1 percent Na₂O, 12.1 percent K₂O and 6.3 percent Re₂O₃, and cationic mole fractions of .524 Na₂O, .414 K₂O and .062 Re₂O₃.

EXAMPLE V 8560 g. of 4 A. zeolite A molecular sieves (T.V. 33.6 percent) is treated with 22.7 liters of a 5.5 percent rare earth chloride solution at 200° F. for 1 hour. The mixture is stirred during contacting. This partially rare earth exchanged zeolite A is washed free of chloride ion, dried and calcined at 1000° F. for 2 hours. This calcined material is cooled and treated with 25.7 liters of a 10.4 percent potassium chloride solution at 200° F. for 1 hour. This mixture is stirred during treatment. This mixture is then filtered, washed three times, and dried at 200° F. This dried 3 A. zeolite A is then activated by heating to 700° F. for 2 hours. This had an analysis of 9.8 percent Na₂O, 11.4 percent K₂O and 6.3 percent Re₂O₃, and cationic mole fractions of .529 Na₂O, .406 K₂O and .065 Re₂O₃.

EXAMPLE VI

This example sets out a comparison of the thermal and steam stabilities of the sieves of Examples II–V, and further a comparison with conventional 3 A. zeolite A sieve, 4 A. zeolite A sieve and 5 A. zeolite sieve. The thermal stability is determined by maintaining the sieve at 1400° F. for 2 hours. The steam stability is determined by maintaining the sieve at 1200° F. for 3 hours in a 100 percent steam environment.

The following table sets out the results of these tests:

TABLE I

| Sample | Water vapor capacity at 10% R.H. (percent) | | | |
|---|---|---|---|---|
| | Thermal stability | | Steam stability | |
| | Before treatment | After treatment | Before steaming | After steaming |
| 5 A. zeolite A sieve | 20.2 | 21.7 | 20.2 | 16.9 |
| 4 A. zeolite A sieve | 22.9 | Nil | | |
| 3 A. zeolite A sieve | 18.0 | 1.2 | 18.0 | Nil |
| Example V sieve | 21.3 | 19.0 | | |
| Example IV sieve | 19.4 | 18.7 | 19.4 | 13.3 |
| Example III sieve | 20.8 | 20.2 | | |
| Example II sieve | 19.6 | 20.0 | 19.6 | 20.0 |

This table illustrates that the ultra-stable 3 A. zeolite A sieves of this invention have a greater stability than conventional 3 A. zeolite A sieves, and further have a greater stability than 5 A. zeolite A sieves which are the most stable zeolite A sieves. This increased stability to thermal and steam environments allows these sieves to be used in extreme environments, and as a most important feature results in a 3 A. zeolite A sieve which can be regenerated at temperatures in the range of up to 1400° F. Such bed temperatures are common in burn-off types of regeneration procedures.

As used in this application, cationic mole percent means the mole percent ratio, one to the other, of the cationic components, sodium, potassium and rare earth. The designation of rare earth is inclusive of ions of atomic number from 57–71.

What is claimed is:

1. An ultra-stable 3 A. zeolite A molecular sieve consisting essentially of

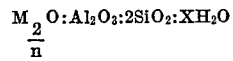

wherein M is a mixture of oxides of sodium, potassium and rare earth metals, in a ratio of essentially

| | Mole percent |
|---|---|
| Na₂O | 25–68 |
| K₂O | 30–60 |
| Re₂O₃ | 2–15 | n the valence of the metal, and X has a value from zero to about 6.

2. An ultra-stable 3 A. zeolite A molecular sieve as in claim 1 wherein said M consists essentially of:

| | Mole percent |
|---|---|
| Na | 47–64 |
| K | 40–45 |
| Re | 4–8 |

3. An ultra-stable 3 A. zeolite A molecular sieve as in claim 1 wherein said M consists essentially of:

| | Mole percent |
|---|---|
| Na | 53 |
| K | 41 |
| Re | 6 |

4. A method for producing an ultra-stable 3 A. zeolite A molecular sieve consisting essentially of

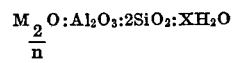

wherein M is a mixture of oxides of sodium, potassium and rare earth metals in a ratio of essentially

| | Mole percent |
|---|---|
| Na₂O | 25–68 |
| K₂O | 30–60 |
| Re₂O₃ | 2–15 | n is the valence of the metal and X has a value from zero to about 6, comprising:
contacting a sodium 4 A. zeolite A molecular sieve with a first solution selected from the group consisting of a rare earth ion solution and potassium ion solution, and
contacting said sieve with a second solution selected from the group consisting of a rare earth ion solution and potassium ion solution, wherein said second solution contains different ions from said first solution.

5. A method as in claim 4 wherein said first solution is a rare earth ion solution and said second solution is a potassium ion solution.

6. A method as in claim 5 wherein after contacting with said first solution, and before contacting with said second solution, said sieve is calcined at from about 500° F. to 1200° F.

7. A method as in claim 4 wherein said first solution is a potassium ion solution, and said second solution is a rare earth ion solution.

8. A method as in claim 7 wherein after contacting with said first solution, and before contacting with said second solution, said sieve is calcined at from about 500° F. to 1200° F.

9. A method as in claim 4 wherein said first solution and said second solution are derived from salts selected from the group consisting of rare earth chloride, rare earth sulfate, rare earth formate, rare earth acetate, potassium chloride, potassium sulfate, potassium nitrate, potassium formate and potassium acetate.

10. A method as in claim 4 wherein said ultra-stable 3 A. zeolite A sieve contains from about 30 to 60 cationic mole percent of potassium ions, and from about 2 to 15 cationic mole percent of rare earth ions.

11. A method as in claim 4 wherein after the second contacting said sieve is washed and activated.

12. A method for producing an ultra-stable 3 A. zeolite A sieve comprising contacting a sodium 4 A. zeolite A molecular sieve with a potassium ion and rare earth ion containing solution, and recovering said ultra-stable 3 A. zeolite A molecular sieve.

13. A method as in claim 12 wherein said potassium ions are in at least 10 to 1 mole ratio to said rare earth ions.

14. A method as in claim 13 wherein after contacting, said sieve is washed and activated.

15. A method as in claim 12 wherein said potassium ions and said rare earth ions are derived from salts selected from the group consisting of rare earth chlorides, rare earth sulfates, rare earth nitrates, rare formates, rare earth acetates, potassium chloride, potassium sulfate, potassium nitrate, potassium formate and potassium acetate.

16. A method as in claim 12 wherein said ultra-stable 3 A. zeolite A sieve contains from about 30 to 60 cationic mole percent of potassium ions, and from about 2 to 15 cationic mole percent of rare earth ions.

References Cited
UNITED STATES PATENTS

| | | | |
|---|---|---|---|
| 3,375,065 | 3/1968 | McDaniel et al. | 23—112 |
| 2,617,712 | 11/1952 | Bond, Jr. | 23—112 |
| 3,059,993 | 10/1962 | Barrer et al. | 23—112 |

CARL F. DEES, Primary Examiner

U.S. Cl. X.R.

23—112, 113